(12) United States Patent
Zalar

(10) Patent No.: US 10,266,414 B2
(45) Date of Patent: Apr. 23, 2019

(54) SUSCEPTOR ARRANGEMENT FOR A REACTOR AND METHOD OF HEATING A PROCESS GAS FOR A REACTOR

(71) Applicant: Hemlock Semiconductor Corporation, Hemlock, MI (US)

(72) Inventor: Michael Matthew Zalar, Midland, MI (US)

(73) Assignee: HEMLOCK SEMICONDUCTOR OPERATIONS LLC, Hemlock, MI (US)

(*) Notice: Subject to any disclaimer, the term of this patent is extended or adjusted under 35 U.S.C. 154(b) by 232 days.

(21) Appl. No.: 15/153,177

(22) Filed: May 12, 2016

(65) Prior Publication Data

US 2016/0374144 A1 Dec. 22, 2016

Related U.S. Application Data

(60) Provisional application No. 62/180,086, filed on Jun. 16, 2015.

(51) Int. Cl.
*H05B 3/10* (2006.01)
*C01B 33/107* (2006.01)
*H05B 3/14* (2006.01)
*H05B 3/42* (2006.01)

(52) U.S. Cl.
CPC ......... *C01B 33/1071* (2013.01); *H05B 3/145* (2013.01); *H05B 3/42* (2013.01); *H05B 2203/022* (2013.01); *Y02P 20/124* (2015.11)

(58) Field of Classification Search
CPC .... H05B 3/40–3/42; H05B 3/10–3/145; H05B 2203/22; H05B 2203/024
See application file for complete search history.

(56) References Cited

U.S. PATENT DOCUMENTS

| | | | |
|---|---|---|---|
| 5,470,360 A | 11/1995 | Sederquist | |
| 5,570,452 A * | 10/1996 | Kuhn | F24H 1/121 122/504 |
| 5,958,140 A * | 9/1999 | Arami | C23C 16/45502 118/715 |
| 6,423,949 B1 * | 7/2002 | Chen | H01L 21/67103 118/725 |

(Continued)

FOREIGN PATENT DOCUMENTS

| | | |
|---|---|---|
| DE | 102011002749 A1 | 7/2012 |
| WO | 03073794 A1 | 9/2003 |

OTHER PUBLICATIONS

Office Action regarding related DE App. No. 10 2016 110 055.2; dated May 28, 2018; 6 pgs.

*Primary Examiner* — Michael A Laflame, Jr.
(74) *Attorney, Agent, or Firm* — Cantor Colburn LLP

(57) ABSTRACT

A susceptor arrangement for a reactor includes a heater element configured to heat a process gas to be used in the reactor. Also included is an inner susceptor portion located radially inwardly of the heater element and configured to route the process gas therein along a radially inner process gas path. Further included is an outer susceptor portion located radially outwardly of the heater element and configured to route the process gas therein along a radially outer process gas path, wherein the radially inner process gas path and the radially outer process gas path are fluidly coupled and substantially fluidly isolated from the heater element.

16 Claims, 2 Drawing Sheets

(56) References Cited

U.S. PATENT DOCUMENTS

| | | | |
|---|---|---|---|
| 9,480,959 B2 | 11/2016 | Ring et al. | |
| 2007/0010033 A1* | 1/2007 | Aderhold | C23C 16/52 438/14 |
| 2008/0092821 A1* | 4/2008 | Otsuka | C23C 16/4583 118/728 |
| 2008/0302781 A1* | 12/2008 | Murakami | C23C 16/4586 219/444.1 |
| 2011/0120366 A1* | 5/2011 | Higashi | C23C 16/4585 117/94 |
| 2013/0074774 A1* | 3/2013 | Liu | C23C 16/46 118/725 |
| 2016/0155616 A1* | 6/2016 | Lee | C23C 16/4584 156/345.33 |
| 2017/0016371 A1* | 1/2017 | Schlipf | H05B 3/48 |
| 2017/0027019 A1* | 1/2017 | Hsieh | H05B 1/0202 |
| 2017/0051406 A1* | 2/2017 | Mori | C23C 16/4412 |
| 2017/0067157 A1* | 3/2017 | Ashihara | C23C 16/45565 |

\* cited by examiner

SUSCEPTOR ARRANGEMENT FOR A REACTOR AND METHOD OF HEATING A PROCESS GAS FOR A REACTOR

CROSS-REFERENCE TO RELATED APPLICATION

This patent application claims priority to U.S. Provisional Patent Application Ser. No. 62/180,086, filed Jun. 16, 2015, which is incorporated herein by reference in its entirety.

TECHNICAL FIELD

Disclosed herein is a reactor and, more particularly, a susceptor arrangement for a heat exchanging reactor, as well as a method of heating a process gas for a reactor.

BACKGROUND

Certain reactors require process gases to be heated for use therein. The reactor may include a susceptor stack in which the process gases are heated and reacted with one another. One particular type of reactor that requires such heating relates to the production of trichlorosilane (SiHCl3) and hydrogen chloride using tetrachlorosilane (SiCl4) and hydrogen (H2) at elevated temperatures to facilitate a hydrogenation reaction of the tetrachlorosilane. The resulting trichlorosilane may be used to produce, or be purified to ultimately produce, high purity (e.g., electronic and/or solar grade) polysilicon.

In order to obtain the above-described reaction, the process gases are heated with a heater element that is located outside of the susceptor. The heater element heats an outer wall of the susceptor and the heat transfer occurs via radiant and convective energy. The heat energy then conducts through the susceptor wall and into the process gas by way of convective and conductive heat transfer.

The above-described externally located heater element results in roughly half of the radiant heat generated actually facing the susceptor stack, thereby resulting in less than optimal heat transfer efficiency. Additionally, operation of the heater element in the above-described configuration requires maintaining the heater element at a temperature that leads to increased structural stress, thereby reducing component life.

SUMMARY

According to an exemplary embodiment, a susceptor arrangement for a reactor includes a heater element configured to heat a process gas to be used in the reactor. Also included is an inner susceptor portion located radially inwardly of the heater element and configured to route the process gas therein along a radially inner process gas path. Further included is an outer susceptor portion located radially outwardly of the heater element and configured to route the process gas therein along a radially outer process gas path, wherein the radially inner process gas path and the radially outer process gas path are fluidly coupled and substantially fluidly isolated from the heater element.

According to another exemplary embodiment, a method of heating a process gas for a reactor is provided. The method includes heating a heater element located within a heater region, wherein the heater region is at least partially defined by an outer susceptor portion, an inner susceptor portion and an end susceptor portion. The method also includes routing a process gas through a process gas path defined by and extending through the outer susceptor portion, the inner susceptor portion and the end susceptor portion, wherein the process gas path is fluidly isolated from the heater element.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
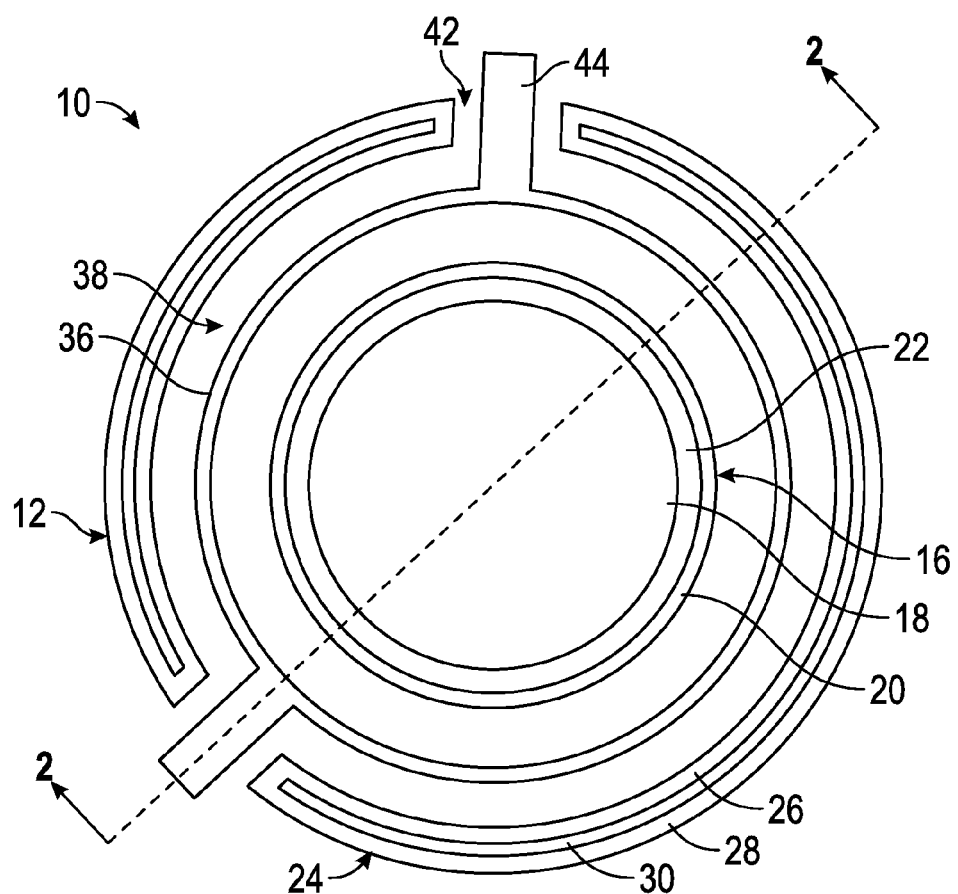
FIG. 1 is an end partial schematic view of a reactor.
Figure 2:
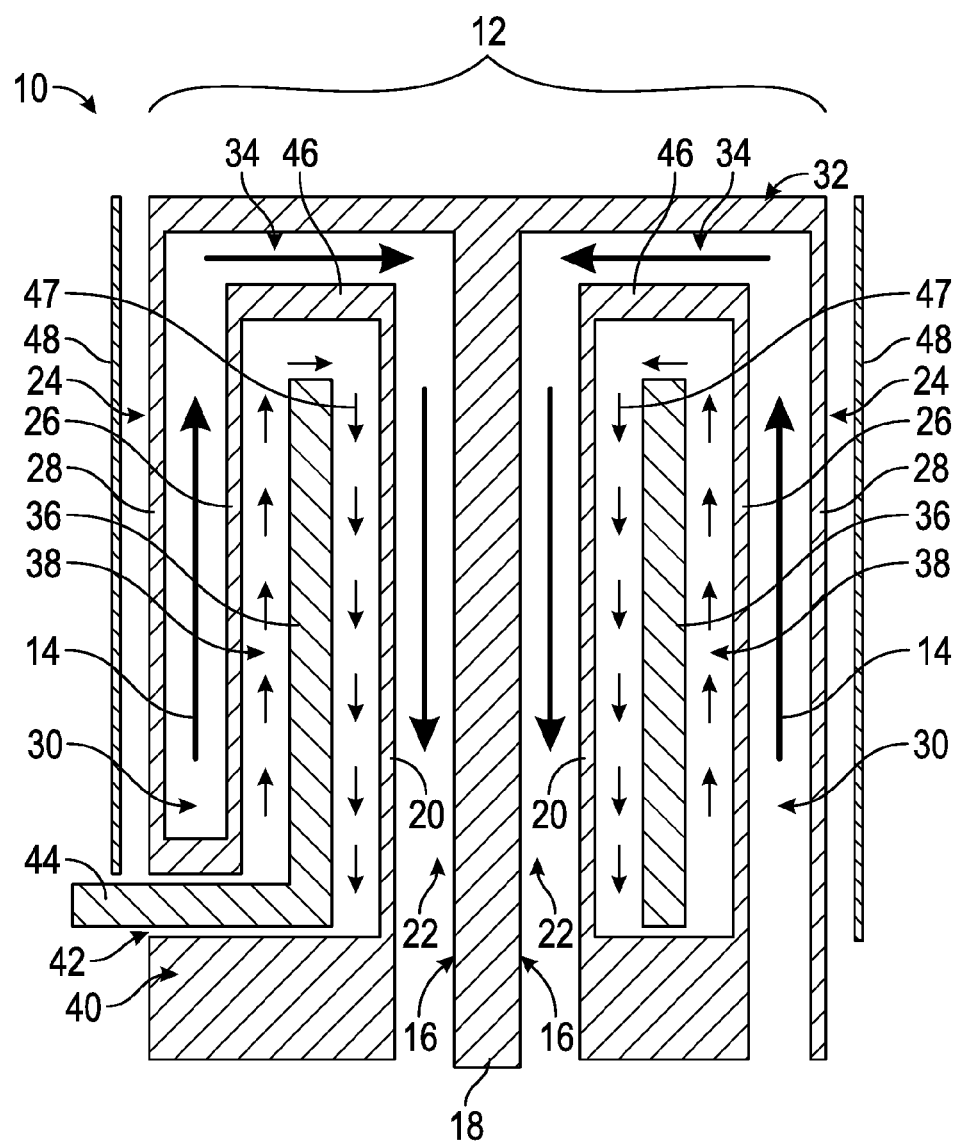
FIG. 2 is a cross-sectional view of the reactor taken along line A-A of FIG. 1.

Referring to FIGS. 1 and 2, a portion of a reactor 10 is schematically illustrated. Although the embodiments disclosed herein may be employed with numerous types of contemplated reactors, the embodiments are particularly beneficial for use with a reactor associated with the hydrogenation of silicon tetrachlorosilane, also referred to as tetrachlorosilane. Such a reactor includes the process of contacting hydrogen gas and tetrachlorosilane at a temperature greater than about 600° C. Together, the combination of the reacting hydrogen gas and tetrachlorosilane is referred to as a process gas, but it is to be appreciated that the process gas may also include one or more additional chlorosilanes, such as trichlorosilane, hydrogen chloride, polysilane, such as hexachlorodisilane, nitrogen, argon, methane, and/or a carbon containing chlorosilane, such as methyltrichlorosilane or methyldichlorosilane. The hydrogenation of tetrachlorosilane at temperatures above about 600° C. is known as are reactors for conducting the process. Often, the process is run at temperatures within a range of about 800° C. to 1,400° C. to increase operating efficiencies, however, temperatures up to 1,600° C. may be employed. The mole ratio of tetrachlorosilane or tetracholrosilane and other chorlosilanes mentioned above to hydrogen gas fed to the reactor is not critical to the practice of the embodiments here. At elevated temperatures, the reaction of the process gas hydrogenates the tetrachlorosilane, as described above, to produce trichlorosilane and hydrogen chloride, with the trichlorosilane that is useful in the production of polysilicon that has value as electronic and solar grade components.

The reactor 10 includes a susceptor arrangement 12 that contains the process gas 14 during the reaction between the hydrogen gas and the tetrachlorosilane. As such, the process gas 14 is routed therethrough for heating and reaction. The susceptor arrangement 12 includes an inner susceptor portion 16 having a first inner susceptor wall 18 and a second inner susceptor wall 20. The first and second inner susceptor walls 18, 20 define a process gas path that is part of the overall process gas flow path circuit, with the process gas path referred to herein as a radially inner process gas path 22. The susceptor arrangement 12 also includes an outer susceptor portion 24 having a first outer susceptor wall 26 and a second outer susceptor wall 28. The first and second outer susceptor walls 26, 28 define a process gas path that is part of the overall process gas flow path circuit, with the process gas path referred to herein as a radially outer process gas path 30. An end susceptor portion 32 is located proximate at an end location of the susceptor arrangement 12 and defines an end process gas path 34 that fluidly couples the radially outer process gas path 30 and the radially inner process gas path 22. The susceptor arrangement 12 may be formed in numerous configurations. In the exemplary illustrated embodiment, the susceptor arrangement 12 has a generally cylindrical geometry and the end susceptor portion 32 is located proximate a top of the overall structure, however, it is to be appreciated that the end susceptor portion 32 may refer to a bottom location, or some region therebetween, so long as the end process gas path 34 fluidly couples the radially outer process gas path 30 and the radially inner process gas path 22.

The susceptor arrangement 12 is constructed of materials suitable for high temperature reactors. For example, the susceptor arrangement 12 may be formed of graphite, silicon carbide coated graphite, silicon carbide coated carbon fiber, a silicon carbide based compound including silicon carbide, or combinations thereof. The preceding list is merely illustrative and is not intended to be limiting.

Irrespective of the precise materials used to form the susceptor arrangement 12, the inner susceptor portion 16 is located radially inwardly of the outer susceptor portion 24, with a space therebetween. More specifically, the second inner susceptor wall 20 is disposed radially outwardly of the first inner susceptor wall 18, the first outer susceptor wall 26 is disposed radially outwardly of the second inner susceptor wall 20, and the second outer susceptor wall 28 is disposed radially outwardly of the first outer susceptor wall 26. Located between the inner susceptor portion 16 and the outer susceptor portion 24 is a heater element 36. In particular, the heater element 36 is located between the second inner susceptor wall 20 and the first outer susceptor wall 26. As such, the heater element 36 is disposed at an internal location of the susceptor arrangement 12, with the internal location referred to herein as a heater region 38.

The heater element 36 may be formed of numerous suitable materials, including carbon, graphite, or a silicon carbide coated carbon composite, for example. The configuration of the heater element 36 is typically a cylindrical structure that is similar to the geometry of the inner susceptor portion 16 and the outer susceptor portion 24. In the illustrated embodiment, the heater element 36 extends from a location proximate a bottom portion 40 of the susceptor arrangement 12 to a location proximate the end susceptor portion 32. It is to be appreciated that the height of the heater element 36 may vary from that illustrated, but typically extending in the manner shown optimizes heat transfer from the heater element 36 to the process gas 14, as will be described in detail below. Although the heater element 36 is referred to and illustrated as a single, unitary structure, it is to be appreciated that the heater element 36 may be formed of multiple pieces to form the overall structure.

In some embodiments, the heater element 36 is positioned within the heater region 38 at a location that is substantially equidistant from the second inner susceptor wall 20 and the first outer susceptor wall 26 to optimize heat transfer to the process gas 14 flowing within the radially outer process gas path 30 and the radially inner process gas path 22. Such positioning typically facilitates a substantially equal distribution of heat to the process gas 14, however, certain embodiments may achieve substantially equal heat distribution with an alternative positioning. Furthermore, it may be desirable to transfer more heat to either the inner susceptor portion 16 or the outer susceptor portion 24. Therefore, the precise location of the heater element 36 may vary depending on the particular application. Regardless of the exact location of the heater element 36 relative to the inner susceptor portion 16 and the outer susceptor portion 24, the outer susceptor portion 24 includes at least one opening 42 through which an electrode 44 may be routed through. In order to generate heat to be transferred to the process gas 14, the electrode 44 is connected to an external energy source (not illustrated) and electrically connected to the heater element 36. In the illustrated embodiment, two openings 42 are provided to allow connection of two electrodes 44. It is contemplated that more or less electrodes and openings are employed to electrically connect the external power source to the heater element 36. Specifically, anywhere from 2-10 openings may be provided to allow connection of 2-10 respective electrodes, but more typically 2-4 openings are provided to allow connection of 2-4 respective electrodes.

FIG. 2 illustrates the flow path that the process gas 14 is routed through, namely the radially outer process gas path 30, the end process gas path 34 and the radially inner process gas path 22. Based on the positioning of the heater element 36, the radiant heat transfer from the heater element 36 is substantially evenly distributed to the path portions noted above. The radiant heat is conducted through the first outer susceptor wall 26, the second inner susceptor wall 20, and an inner end portion wall 46. Radiant and convective heat transfer within the flow paths of the process gas 14 is then transferred to the process gas 14 for heating thereof. In contrast to positioning the heater element 36 external to the susceptor arrangement 12, all of the heat transfer is directed to the process gas 14 based on the surrounded nature of the heater element 36 within the susceptor arrangement 12.

The heater element 36 within the heater region 38 is substantially fluidly isolated from the reactive process gas 14. This extends the life of the heater element 36. The term "substantially" is employed based on the fact that a small amount of the process gas seeps into the heater region 38, but it is to be understood that the small contemplated leaked amounts do not render the embodiments described herein inoperable for an intended purpose. To further enhance the fluid isolation, the heater region 38 is purged with a heater element protective fluid 47. The purging increases the pressure within the heater region 38 and reduces the likelihood of any of the process gas 14 directly contacting the heater element 36. The heater element protective fluid 47 may include at least one of gaseous silicon tetracholoride, trichlorosilane, dichlorosilane, monochlorosilane, nitrogen, argon, and hydrogen chloride. In some embodiments, the heater element protective fluid 47 is exclusively or a majority of tetracholorosilane. The above-noted protective fluids are selected based on properties that lead to them being less reactive with typical heater element materials, when compared to hydrogen gas. Typically, the majority of the process gas is hydrogen gas, although this is not required. Hydrogen gas has been shown to be aggressively detrimental to the heater element materials, such that a reduction or prevention of leakage of hydrogen gas into the heater region is desirable. The preceding list is merely illustrative and is not intended to be limiting. In addition to or in lieu of the heater element protective fluid 47, the heater region 38 may be pressurized in some other suitable manner. Regardless of the manner in which pressurization is achieved, typically the pressure within the heater region 38 is greater than the pressure within the reaction zone of the process gas 14 to make it more likely that the heater element protective fluid 47 leaks to the reaction zone than the process gas 14 leaking into the heater region 36.

To contain as much heat energy in the desired location, a heat shield 48 (FIG. 2) may be fixed at a location radially outwardly of the susceptor arrangement 12. Specifically, as shown, the heat shield 48 may be located radially outwardly of the second outer susceptor wall 28. The heat shield 48 reflects heat back toward the susceptor arrangement 12 to increase heat transfer efficiency of the heater element 36. To enhance the reflective properties of the assembly, insulation material may be located along an exterior surface of the heat shield 48.

Advantageously, the above-described embodiments of the reactor 10, and more specifically the susceptor arrangement 12 and heater element 36, enables the heater to operate at a lower maximum temperature than in an embodiment having an externally located heater element 36. This is attributed to the more efficient heat transfer to the process gas 14, thereby lowering the demand on the heater element 36. Operation at a lower temperature reduces damage to the heater element material and slows the failure of the heater element 36 over time. Additionally, modeling has shown that the embodiments described herein reduce temperature gradients within the heater element 36 by roughly 30% over an externally located heater element. This is beneficial as thermal gradients introduce stress into the heater due to different sections of the heater expanding differently. Therefore, a lower thermal gradient significantly reduces the associated stresses and leads to a much prolonged life of the heater element 36.

The structures and methods disclosed herein include at least the following embodiments:

Embodiment 1

A susceptor arrangement for a reactor includes a heater element configured to heat a process gas to be used in the reactor. Also included is an inner susceptor portion located radially inwardly of the heater element and configured to route the process gas therein along a radially inner process gas path. Further included is an outer susceptor portion located radially outwardly of the heater element and configured to route the process gas therein along a radially outer process gas path, wherein the radially inner process gas path and the radially outer process gas path are fluidly coupled and substantially fluidly isolated from the heater element.

Embodiment 2

The susceptor arrangement of Embodiment 1, wherein the inner susceptor portion comprises a first inner susceptor wall and a second inner susceptor wall, the first inner susceptor wall and the second inner susceptor wall defining the radially inner process gas path, wherein the outer susceptor portion comprises a first outer susceptor wall and a second outer susceptor wall, the first outer susceptor wall and the second outer susceptor wall defining the radially outer process gas path.

Embodiment 3

The susceptor arrangement of Embodiments 1 or 2, further comprising an end susceptor portion defining an end process gas path that fluidly couples the radially outer process gas path and the radially inner process gas path.

Embodiment 4

The susceptor arrangement of any of the preceding Embodiments, wherein the inner susceptor portion and the outer susceptor portion are formed of at least one of graphite, silicon carbide coated graphite, silicon carbide coated carbon fiber, and a silicon carbide based compound including silicon carbide.

Embodiment 5

The susceptor arrangement of any of the preceding Embodiments, further comprising at least one opening defined by the outer susceptor portion, the opening configured to receive a heater electrode therein.

Embodiment 6

The susceptor arrangement of any of the preceding Embodiments, wherein the reactor is a hydrogenation reactor configured to produce trichlorosilane by reacting tetrachlorosilane and hydrogen into trichlorosilane and hydrogen chloride.

Embodiment 7

The susceptor arrangement of any of the preceding Embodiments, wherein the heater element is disposed in a heater region radially defined by the inner susceptor portion and the outer susceptor portion.

Embodiment 8

The susceptor arrangement of Embodiment 7, wherein the heater region is purged with a heater element protective fluid.

Embodiment 9

The susceptor arrangement of Embodiment 8, wherein the heater element protective fluid is at least one of gaseous tetrachlorosilane, trichlorosilane, dichlorosilane, monochlorosilane, nitrogen, argon and hydrogen chloride.

Embodiment 10

The susceptor arrangement of any of the preceding Embodiments, wherein the heater element is positioned to equally distribute heat to the inner susceptor portion and the outer susceptor portion.

Embodiment 11

The susceptor arrangement of any of the preceding Embodiments, wherein the heater element is positioned equidistant from the inner susceptor portion and the outer susceptor portion.

Embodiment 12

The susceptor arrangement of any of the preceding Embodiments, wherein the inner susceptor portion, the outer susceptor portion and the heater element are each cylindrically shaped.

Embodiment 13

The susceptor arrangement of Embodiment 3, wherein the end susceptor portion is located proximate a top region of the susceptor arrangement.

Embodiment 14

The susceptor arrangement of Embodiment 13, further comprising a bottom susceptor portion extending between the outer susceptor portion and the inner susceptor portion, wherein the end susceptor portion, the bottom susceptor portion, the inner susceptor portion and the outer susceptor portion enclose the heater element.

Embodiment 15

The susceptor arrangement of any of the preceding Embodiments, further comprising a heat shield disposed radially outwardly of the outer susceptor portion.

Embodiment 16

The susceptor arrangement of any of the preceding Embodiments, wherein the process gas comprises a majority of hydrogen and a minority of at least one of tetrachlorosilane, chlorosilane, hydrogen chloride, a polysilane, and a carbon containing chlorosilane.

Embodiment 17

A method of heating a process gas for a reactor is provided. The method includes heating a heater element located within a heater region, wherein the heater region is at least partially defined by an outer susceptor portion, an inner susceptor portion and an end susceptor portion. The method also includes routing a process gas through a process gas path defined by and extending through the outer susceptor portion, the inner susceptor portion and the end susceptor portion, wherein the process gas path is fluidly isolated from the heater element.

Embodiment 18

The method of Embodiment 17, further comprising purging the heater region with a heater element protective fluid comprising at least one of gaseous tetrachlorosilane, trichlorosilane, dichlorosilane, monochlorosilane, nitrogen, argon and hydrogen chloride.

Embodiment 19

The method of Embodiment 17, further comprising distributing heat from the heater element in a equal distribution to the inner susceptor portion and the outer susceptor portion.

Embodiment 20

The method of Embodiment 17, further comprising routing the process gas through the process gas path along regions radially outwardly of the heater element and radially inwardly of the heater element.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A susceptor arrangement for a reactor comprising:
   a heater element configured to heat a process gas to be used in the reactor;
   an inner susceptor portion located radially inwardly of the heater element and configured to route the process gas therein along a radially inner process gas path; and
   an outer susceptor portion located radially outwardly of the heater element and configured to route the process gas therein along a radially outer process gas path, wherein the radially inner process gas path and the radially outer process gas path are fluidly coupled and substantially fluidly isolated from the heater element.

2. The susceptor arrangement of claim 1, wherein the inner susceptor portion comprises a first inner susceptor wall and a second inner susceptor wall, the first inner susceptor wall and the second inner susceptor wall defining the radially inner process gas path, wherein the outer susceptor portion comprises a first outer susceptor wall and a second outer susceptor wall, the first outer susceptor wall and the second outer susceptor wall defining the radially outer process gas path.

3. The susceptor arrangement of claim 1, further comprising an end susceptor portion defining an end process gas path that fluidly couples the radially outer process gas path and the radially inner process gas path.

4. The susceptor arrangement of claim 1, wherein the inner susceptor portion and the outer susceptor portion are formed of at least one of graphite, silicon carbide coated graphite, silicon carbide coated carbon fiber, and a silicon carbide based compound including silicon carbide.

5. The susceptor arrangement of claim 1, further comprising at least one opening defined by the outer susceptor portion, the opening configured to receive a heater electrode therein.

6. The susceptor arrangement of claim 1, wherein the reactor is a hydrogenation reactor configured to produce trichlorosilane by reacting tetrachlorosilane and hydrogen into trichlorosilane and hydrogen chloride.

7. The susceptor arrangement of claim 1, wherein the heater element is disposed in a heater region radially defined by the inner susceptor portion and the outer susceptor portion.

8. The susceptor arrangement of claim 7, wherein the heater region is purged with a heater element protective fluid.

9. The susceptor arrangement of claim 8, wherein the heater element protective fluid is at least one of gaseous tetrachlorosilane, trichlorosilane, dichlorosilane, monochlorosilane, nitrogen, argon and hydrogen chloride.

10. The susceptor arrangement of claim 1, wherein the heater element is positioned to equally distribute heat to the inner susceptor portion and the outer susceptor portion.

11. The susceptor arrangement of claim 1, wherein the heater element is positioned equidistant from the inner susceptor portion and the outer susceptor portion.

12. The susceptor arrangement of claim 1, wherein the inner susceptor portion, the outer susceptor portion and the heater element are each cylindrically shaped.

13. The susceptor arrangement of claim 3, wherein the end susceptor portion is located proximate a top region of the susceptor arrangement.

14. The susceptor arrangement of claim 13, further comprising a bottom susceptor portion extending between the outer susceptor portion and the inner susceptor portion, wherein the end susceptor portion, the bottom susceptor portion, the inner susceptor portion and the outer susceptor portion enclose the heater element.

15. The susceptor arrangement of claim 1, further comprising a heat shield disposed radially outwardly of the outer susceptor portion.

16. The susceptor arrangement of claim 1, wherein the process gas comprises a majority of hydrogen and a minority of at least one of tetrachlorosilane, chlorosilane, hydrogen chloride, a polysilane, and a carbon containing chlorosilane.

* * * * *